(12) United States Patent
Hanriat

(10) Patent No.: US 6,252,449 B1
(45) Date of Patent: Jun. 26, 2001

(54) CLOCK DISTRIBUTION CIRCUIT IN AN INTEGRATED CIRCUIT

(75) Inventor: Stéphane Hanriat, Saint Vincent de Mercuze (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/216,898

(22) Filed: Dec. 21, 1998

(30) Foreign Application Priority Data

Dec. 24, 1997 (FR) .................................................. 97 16723

(51) Int. Cl.$^7$ ................................. G06F 1/04; H03K 3/00
(52) U.S. Cl. ............................................................ 327/295
(58) Field of Search ................................... 327/115, 116, 327/291, 295, 299, 166, 170, 176, 333; 377/47, 48; 326/80, 81

(56) References Cited

U.S. PATENT DOCUMENTS

| | | | |
|---|---|---|---|
| 4,902,911 | 2/1990 | Hoshi | 307/296.3 |
| 5,486,774 | * 1/1996 | Douseki et al. | 326/33 |
| 5,519,350 | * 5/1996 | Diodato et al. | 327/295 |
| 5,669,684 | * 9/1997 | Agan | 326/81 |
| 5,670,899 | * 9/1997 | Kohdaka | 326/97 |
| 5,705,946 | * 1/1998 | Yin | 327/333 |
| 5,963,075 | * 10/1999 | Hiiragizawa | 327/295 |
| 5,973,549 | * 10/1999 | Yuh | 327/541 |

OTHER PUBLICATIONS

French Search Report from French Patent Application 97 16723, filed Dec. 24, 1997.
Patent Abstracts of Japan, vol. 018, No. 480 (E–1603), Sep. 8, 1994 & JP–A–06 163827 (Kawasaki Steel Corp.).
Patent Abstracts of Japan, vol. 004, No. 127 (P–026), Sep. 6, 1980 & JP–A–55 080136 (Fujitsu Ltd.).
Patent Abstracts of Japan, vol. 096, No. 002, Feb. 29, 1996 & JP–A–07 253825 (Toshiba Corp.).
Gasbarro J.A. et al., "Integrated Pin Electronics For VLSI Functional Testers" Proceedings Of The Custom Integrated Circuits Conference, New York, May 16–19, 1988, No. CONF. 10, May 16, 1988 pp 1621–1624, Institute Of Electrical and Electronicsl Engineers.
Cooke L.H. "Re–Implementation Synthesis" Intellectual Leverage, San Francisco, Feb. 27 –Mar. 3, 1989 No. CONF. 34, Feb. 27, 1989, pp 462–468, Institute of Electrical and Electronics Engineers Patent Abstracts of Japan, vol. 014, No. 537 (E–1006), Nov. 27, 1990 & JP–A–02 228810 (NEC Eng Ltd).

* cited by examiner

*Primary Examiner*—My-Trang Nuton
(74) *Attorney, Agent, or Firm*—Wolf, Greenfield & Sacks, P.C.; James H. Morris; Theodore E. Galanthay

(57) ABSTRACT

The present invention relates to an integrated circuit including at least one logic circuit, able to operate at a first operating frequency, and a clock distribution circuit, the clock distribution circuit receiving a first clock signal and providing to the logic circuit a second clock signal, generated from the first clock signal, the frequency of the second clock signal being substantially equal to the first operating frequency. The clock distribution circuit includes a frequency multiplying circuit for generating the second clock signal, so that the frequency of the first clock signal may be lower than the first operating frequency to reduce or minimize the power consumed by the clock distribution circuit.

33 Claims, 2 Drawing Sheets

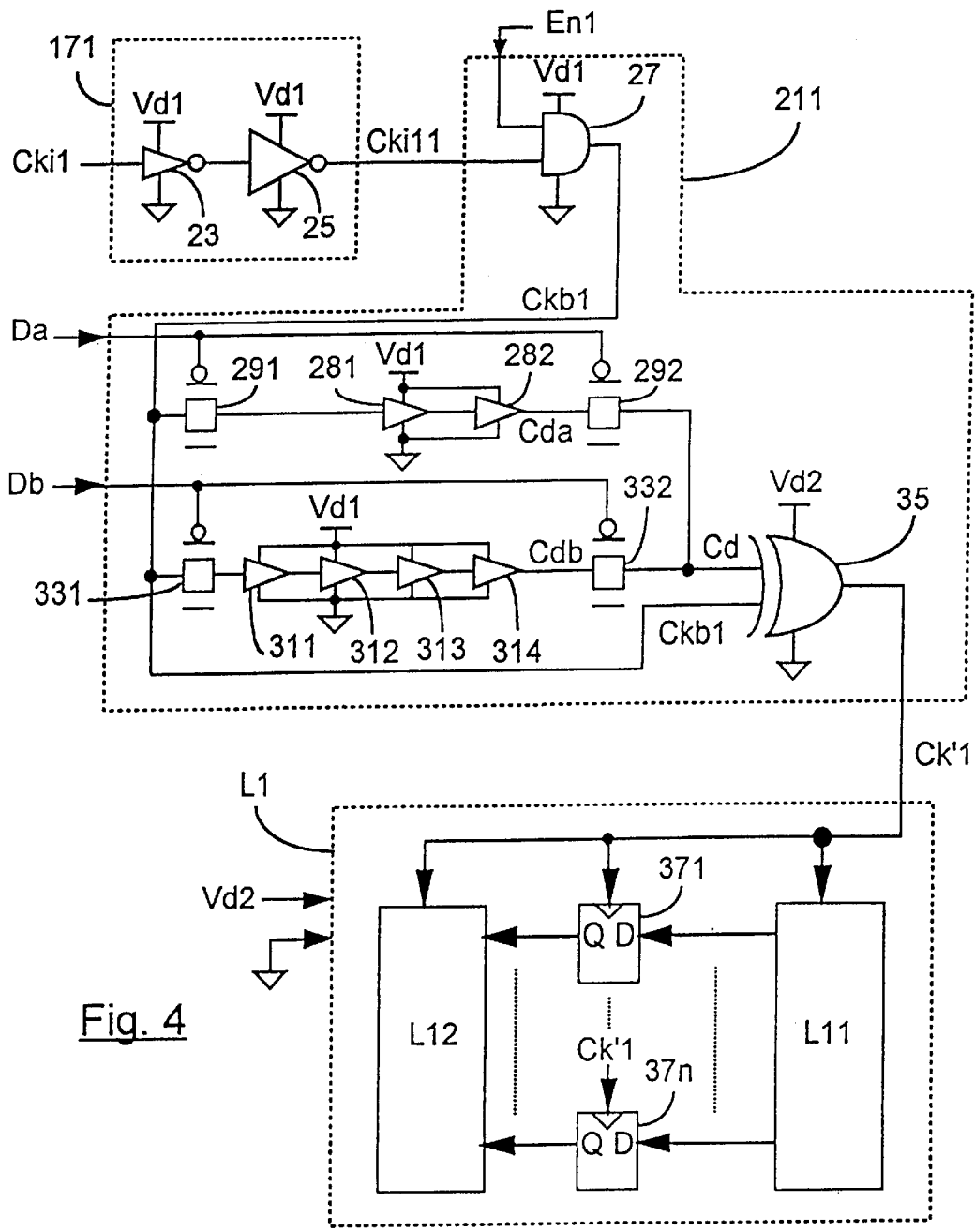
Fig. 4
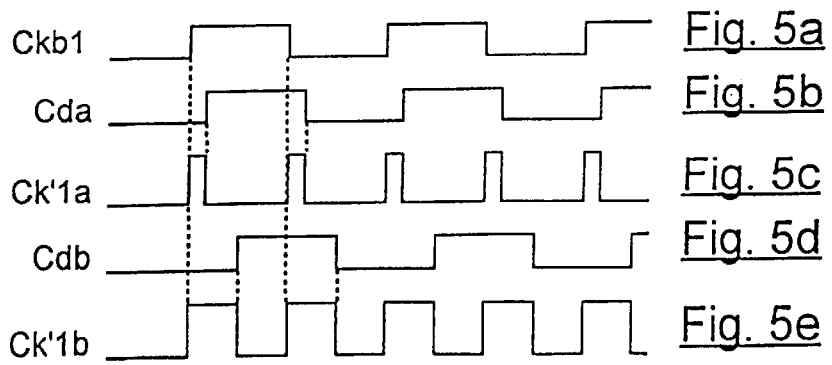
Fig. 5a
Fig. 5b
Fig. 5c
Fig. 5d
Fig. 5e

CLOCK DISTRIBUTION CIRCUIT IN AN INTEGRATED CIRCUIT

BACKGROUND OF THE INVENTION

1. Field of the Invention

The present invention relates to the field of integrated circuits and, more specifically, integrated circuits comprising, on the one hand, internal logic circuits and, on the other hand, a clock signal distribution circuit for driving these logic circuits.

2. Discussion of the Related Art

In conventional integrated circuits, it is generally attempted to decrease the power consumed. The power consumption of circuits sometimes becomes one of the main criteria in their definition, for example, in applications powered by a battery having a limited lifetime.

To achieve this object, a present tendency is to decrease the supply voltage of integrated circuits. In logic integrated circuits (or integrated circuits including logic circuits) driven by a clock signal, this tendency to decrease the supply voltage increases with the general desire to increase the frequency of the clock signal driving these circuits. Now, the power consumed by these circuits is also proportional to the clock signal frequency.

The decrease of the supply voltage generally raises problems in the definition of the integrated circuits. Indeed, new methods which minimize the sources of losses, such as, for example, the transistor threshold voltages, often have to be developed. Such new methods are generally more complex, and thus more difficult to implement and costly in terms of development and/or production. It can further be attempted to improve the circuits, to decrease their power consumption. In the same way as for the definition of new methods, this circuit optimization can be difficult and result in higher development and/or production costs.

SUMMARY OF THE INVENTION

An aim of the present invention is to provide a solution to minimize or reduce the power consumed in logic circuits, or in circuits including logic circuits, and which is easily implementable and of low cost.

For this purpose, it is provided, for an operation of the logic circuits at a given frequency, said operation being driven by a clock signal, to provide the desired frequency only locally, at the level of the logic circuits meant to operate at said frequency, and to decrease the frequency in the clock distribution circuits. Thus, for a given supply voltage, the power consumption induced by the clock distribution circuits is reduced or minimized, and the general power consumption of the integrated circuits is thus also reduced. This reduction of the power consumption is all the more important as, generally, clock distribution circuits physically extend across all logic integrated circuits, from one or two peripheral connections receiving an external clock signal or connected to the terminals of an external quartz crystal oscillator. The distribution of the external clock signal (or of an internal clock signal generated locally from the quartz crystal oscillator) is performed via conductive lines forming a tree structure extending across the circuit. The conductive lines have an equivalent stray capacitance which increases as the surface area of the integrated circuit increases the power consumption induced by such a distribution circuit is proportional to the equivalent capacitance. Power consumption thus becomes significant for present circuits, in which it is desired to integrated more and more functions, which results in an increase in the circuit surface area.

Thus, the present invention relates to an integrated circuit including at least one logic circuit, able to operate at a first operating frequency, and a clock distribution circuit, the clock distribution circuit receiving a first clock signal and providing to the logic circuit a second clock signal, generated based on the first clock signal, the frequency of the second clock signal being substantially equal to the first operating frequency. The clock distribution circuit includes a frequency multiplying circuit for generating the second clock signal, so that the frequency of the first clock signal may be lower than the first operating frequency to reduce or minimize the power consumed by the clock distribution circuit.

According to an embodiment, the clock distribution circuit includes a frequency dividing circuit for generating, from the first clock signal, a clock signal internal to the clock distribution circuit, the internal clock signal having a frequency lower than the frequency of the first clock signal, to reduce or minimize the power consumed by the clock distribution circuit.

According to an embodiment, the frequency multiplying circuit includes control means for maintaining the second clock signal in a permanent state, to reduce or minimize the power consumed by the logic circuit.

According to an embodiment, the frequency multiplying circuit receives an input clock signal. It includes, on the one hand, delay means for generating, by time dephasing, based on the input clock signal, a delayed clock signal and, on the other hand, logic means for generating the second clock signal by performing a logic combination of X-OR type between the input clock signal and the delayed clock signal.

According to an embodiment, the frequency multiplying circuit includes means for modifying the time dephasing applied to the input clock signal.

According to an embodiment, the frequency multiplying circuit includes, on the one hand, several delay means for generating, by time dephasing, several delayed signals and, on the other hand, selection means for combining the input clock signal with one of the delayed signals.

According to an embodiment, the logic circuit being supplied by a first supply potential, the clock distribution circuit is partly supplied by a second supply potential, of a value lower than the value of the first supply potential, to reduce or minimize the power consumed by the clock distribution circuit.

According to an embodiment, the logic means of the frequency multiplying circuit are supplied by the first supply potential and the other elements of the clock distribution circuit are supplied by the second supply potential.

The foregoing objects, features and advantages of the present invention will be discussed in detail in the following non-limiting description of specific embodiments in connection with the accompanying drawings.

BRIEF DESCRIPTION OF THE DRAWINGS

FIG. 4 shows an example of a frequency multiplying circuit that can be implemented in the circuit according to the present invention, FIGS. 5a to 5e timing diagrams of signals illustrating the operation of the circuit of FIG. 4.

DETAILED DESCRIPTION

Figure 1:
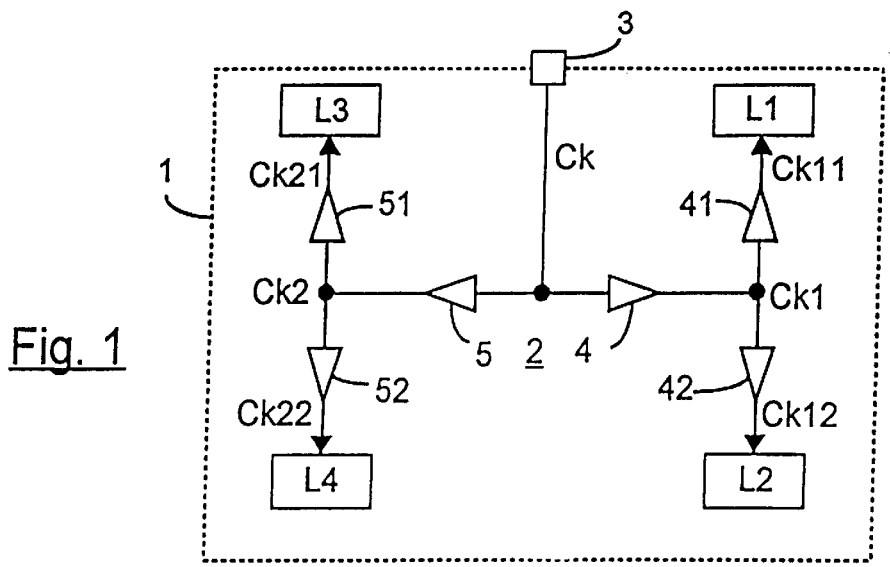
FIG. 1 schematically shows a logic integrated circuit including a system of distribution of a clock signal according to the state of the art.

FIG. 1, representative of the state of the art, schematically illustrates an integrated circuit 1 including a circuit 2 of distribution of a clock signal Ck. Clock signal Ck is, for example, received on an input 3 of integrated circuit 1.

"Clock signal" designates a logic signal, the potential of which oscillates between two values (typically, the value of a ground potential Gnd and the value of a positive supply potential Vdd, difference Vdd−Gnd representing the supply voltage of circuit 1). The first value will correspond to a first logic state, noted "0", commonly called the low state. The second value will correspond to a second logic state, noted "1", commonly called the high state.

Figure 2:
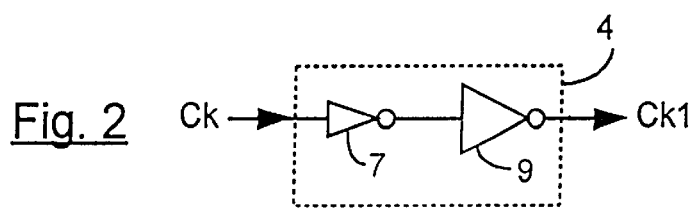
FIG. 2 shows an example of a buffer circuit according to the state of the art, FIG. 3 schematically shows a clock distribution circuit according to the present invention.

Integrated circuit 1 includes several logic circuits L1, L2, L3, and L4, the operation of which is desired to be driven according to clock signal Ck, said clock signal being provided thereto by distribution circuit 2. Such as illustrated, signal Ck is provided to two buffer circuits 4 and 5. These buffer circuits are, commonly, formed of an even number of logic inverters. FIG. 2 illustrates an example of implementation of buffer circuit 4. This buffer circuit includes two logic inverters 7 and 9 connected in series. The function of the buffer circuits is to regenerate clock signal Ck. Indeed, said signal is, typically, provided to buffer circuit 4 by a conductive line formed of a metal. This line has a certain electric resistance and a certain equivalent capacitance, which are not zero. Thereby, it behaves as an R-C filter in which the clock signal propagates. The edges marking, in clock signal Ck, the switching from one logic state to the other will be damped. Inverter 7, for example of CMOS type, rapidly brings the amplitude of clock signal Ck to its original value (assuming that it is supplied by potentials Gnd and Vdd) and decreases the time duration of the transitions between states in signal Ck. Inverter 9, which will be chosen in practice with a greater size than inverter 7, generates a clock signal of the same polarity as signal Ck. The size of inverter 9 will be chosen so that it can provide a sufficient current to avoid, downstream of this inverter, that the damping of the signal that it generates on its output becomes so large that this signal cannot be used as a clock signal.

Buffer circuits 4 and 5 generate a first set of clock signals Ck1 and Ck2. In the example illustrated, these second clock signals Ck1 and Ck2 are themselves provided to four buffer circuits bearing, respectively, references 41 and 42, for the circuits receiving signal Ck1, and 51 and 52, for the circuits receiving signal Ck2. The four buffer circuits will be, for example, identical to buffer circuit 4 of FIG. 2.

Buffer circuits 41, 42, 51, and 52 generate a second set of clock signals Ck11, Ck12, Ck21, and Ck22. These signals are provided, respectively, to logic circuits L1, L2, L3, and L4 to drive their operation. In practice, the buffer circuits and conductive lines of the circuit of distribution of clock signal Ck will be sized so that the branches connecting the logic circuits to input 3 have equivalent characteristics. This reduces or minimizes the dephasings between the clock signals provided to the logic circuits, since the presence of dephasings can be a problem if these circuits are meant to operate synchronously.

The example of FIG. 1 is given as an indication. In an integrated circuit including several logic circuits, the distribution circuit will be adapted to the circuit surface area and to the localization of the logic circuits meant to receive the distributed signal. Thus, the number of branches can be more or less significant. Similarly, it may be chosen to supply a higher number of sub-branches from the same buffer circuit.

Figure 3:
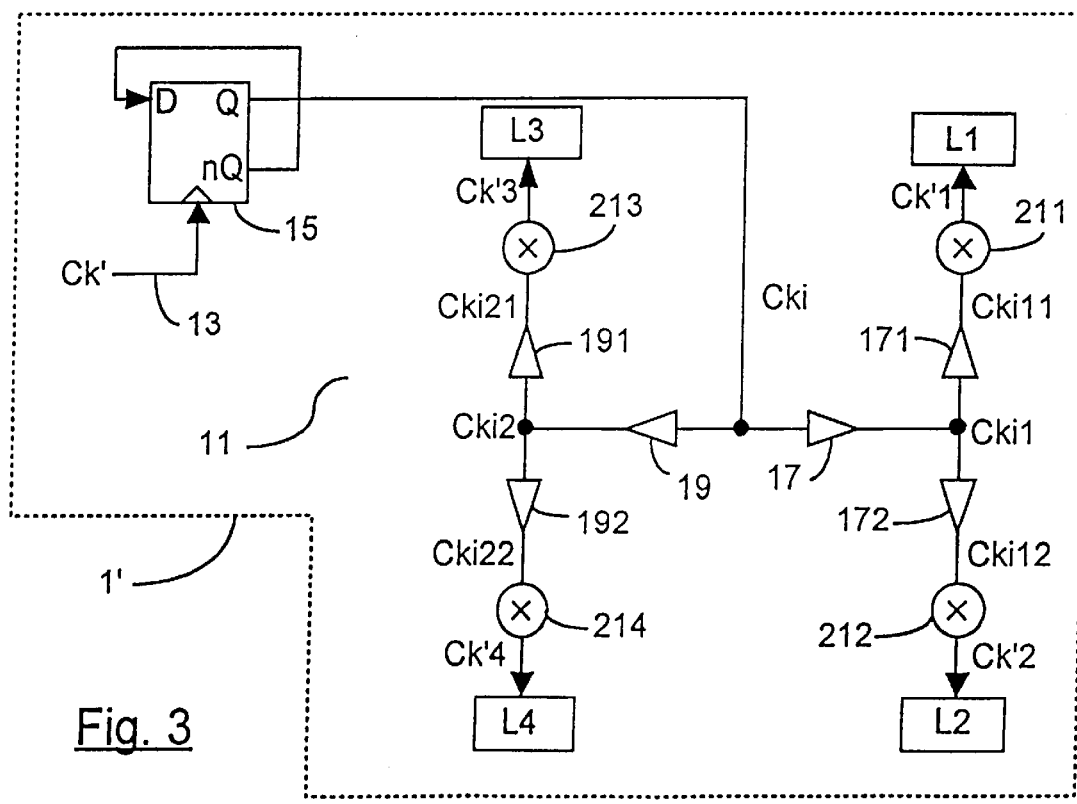

FIG. 3 illustrates an integrated circuit 1' implementing the present invention.

As in the example illustrated in FIG. 1, it will be assumed that circuit 1' includes several logic circuits L1, L2, L3, and L4, the operation of which is desired to be driven by using a clock signal Ck'. Signal Ck' may be a signal received from the outside or a signal generated internally by an oscillator. To provide the logic circuits with the clock signal, a clock distribution signal 11 is used. Clock distribution circuit 11 receives clock signal Ck' and provides the logic circuits with local clock signals, respectively bearing references Ck'1, Ck'2, Ck'3, and Ck'4, generated based on clock signal Ck'.

As will be described in the following, according to the present invention, the clock signals provided to the logic circuits are generated by frequency multiplying circuits. Accordingly, the operating frequency of the clock distribution circuit, upstream of the frequency multiplying circuits, is reduced. The power consumed by the integrated circuit is thus reduced or minimized, by reducing or minimizing the power consumed by the clock distribution circuit.

Advantageously, clock distribution circuit 11 includes a frequency dividing circuit 15 for generating, based on clock signal Ck', a clock signal Cki, internal to the clock distribution circuit. Clock signal Cki has a frequency lower than the frequency of clock signal Ck'. An advantage of the frequency dividing circuit is that it reduces the power consumed by the clock distribution circuit, this power being proportional to the operating frequency of the distribution circuit. In the example, frequency dividing circuit 15 is formed by a flip-flop receiving clock signal Ck' on its control input. Its non-inverting output Q provides clock signal Cki and its inverting output nQ is connected to input D. It will be easily shown that the frequency of clock signal Cki is half the value of the frequency of clock signal Ck'. Of course, it could be chosen to use another type of frequency dividing circuit and/or to use a different division factor.

The use of a frequency dividing circuit at the input of the clock distribution circuit has another advantage if it is desired to implement the present invention in an application already developed and driven by a clock signal of determined frequency. Indeed, an integrated circuit receiving this clock signal can be modified transparently for the other circuits connected thereto. It is enough, for this purpose, to only modify the clock distribution circuit, with the functional elements of the circuit remaining unchanged. More precisely, if the multiplying circuits are sized to have a multiplying factor inverse of the division factor, the frequency decrease in the clock distribution circuit will not be seen from the outside.

In the example illustrated, internal clock signal Cki is provided to two buffer circuits 17 and 19, which can for example be implemented as in the circuit illustrated in FIG. 2. Buffer circuits 17 and 19 generate a first set of clock signals Cki1 and Cki2. In the example illustrated, these second clock signals Cki1 and Cki2 are provided to four buffer circuits, respectively bearing references 171 and 172, for the circuits receiving signal Cki1, and 191 and 192, for the circuits receiving signal Cki2. These buffer circuits will be, for example, identical to buffer circuit 4 of FIG. 2. Buffer circuits 171, 172, 191, and 192 generate a second set of clock signals Cki11, Cki12, Cki21, and Cki22.

Signals Cki11, Cki12, Cki21, and Cki22 are provided, respectively, to frequency multiplying circuits 211, 212, 213, and 214. Circuits 211, 212, 213, and 214 generate clock signals Ck'1, Ck'2, Ck'3, and Ck'4 which are provided, respectively, to logic circuits L1, L2, L3, and L4, to drive their operation. If these logic circuits are meant to operate synchronously, the buffer circuits and conductive lines of clock distribution circuit 11 will preferably be sized so that the branches connecting the logic circuits have equivalent characteristics. This reduces or minimizes the dephasings between clock signals provided to the logic circuits, since the presence of such dephasings can be a problem.

By using frequency multiplying circuits to generate the clock signals locally provided to the logic circuits, the frequencies of clock signals Ck' and Cki can be lower than the desired operating frequencies of the logic circuits. Thus, the power consumed by clock distribution circuit 11 can be reduced or minimized, as compared to circuit 2 of FIG. 1.

FIG. 4 illustrates an example of implementation of frequency multiplying circuit 211, which receives as an input clock signal Cki11 and generates clock signal Ck'1 which drives logic circuit L1 (as an example, signal Ck'1 may be used to control flip-flops 371 to 37n arranged between subcircuits L11 and L12).

Of course, the other frequency multiplying circuits of clock distribution circuit 11 can be implemented similarly.

In the described circuit, as an example, the frequency of signal Ck'1 is double that of signal Cki11.

Advantageously, frequency multiplying circuit 211 includes control means for maintaining clock signal Ck'1 in a permanent state. These means include, in one embodiment, an AND-type logic gate 27. Logic gate 27 includes two inputs and one output. On its first input, it receives clock signal Cki11. On its second input, it receives a logic control signal En1. The signal generated by logic gate 27 is noted Ckb1. If signal En1 is in a first state, here the high state, signal Ckb1 reproduces signal Cki11. Signal Ckb1 is then used to generate clock signal Ck'1. If signal En1 is in a second state, in the present case, the low state, signal Ckb1 is in a permanent state, here the low state. Signal Ck'1 will then be maintained in a permanent state (here the low state, given the structure of circuit 211, which will be detailed hereafter). Accordingly, the power consumed by circuit 1' including logic circuit L1 can be reduced or minimized, since this latter logic circuit no longer receives, from a functional point of view, any clock signal.

It may be chosen not to use any means for maintaining the generated signal in a permanent state. It will then be assumed that Ckb1=Cki11.

Frequency multiplying circuit 211 includes delay means to generate by time dephasing, from internal clock signal Ckb1, a first delayed clock signal Cda. The delay means will be formed, for example, of two buffer circuits 281 and 282 connected in series.

Circuit 211 further includes logic means for generating clock signal Ck'1 by performing a logic combination of X-OR type between clock signal Ckb1 and delayed clock signal Cda. In the example illustrated, these logic means include a logic gate 35 of X-OR type, including two inputs and one output. The output of gate 35 generates clock signal Ck'1. It receives as an input signal Ckb1 and a signal Cd.

Signal Cd is a signal obtained by selection of a delayed signal from among several generated delayed signals. The described frequency multiplying circuit 211 indeed includes means for modifying the time dephasing applied to clock signal Ckb1. For this purpose, circuit 211 includes additional delay means to generate, by time dephasing, based on internal clock signal Ckb1, a second delayed clock signal Cdb, generated by buffer circuits 311, 312, 313, and 314 connected in series. Signals Cda and Cdb are provided to logic gate 35 via CMOS switches 292 and 332 controlled by logic signals Da and Db. By only turning on one of these switches, Cd=Cda or Cd=Cdb will be selected (there could possibly be Da=Db and switches 292 and 332 could be used to form a multiplexer providing signal Cd). It should be noted that, in the example illustrated, signal Ckb1 is provided to the chains of buffer circuits via CMOS switches 291 and 331, which are controlled by signals Da and Db. When one of the chains is selected to generate signal Cd, it is then not necessary to provide signal Ckb1 (which oscillates, when En1=1) at the input of the other chain. The power consumption of the chain of unused buffer circuits can thus be reduced or minimized. Buffer circuits, the operation of which is drivable, could also be used to achieve the same purpose.

The implementation of the frequency multiplying is illustrated by FIGS. 5a to 5e. FIGS. 5a, 5b, and 5d respectively show timing diagrams of signals Ckb1, Cda, and Cdb. It is assumed that the delay introduced by circuits 311 to 314 is higher than that introduced by elements 281 and 282 and corresponds to one quarter of the period of signal Ckb1, assumed to be square, that is, of duty ratio ½.

FIGS. 5c and 5e show timing diagrams of signals Ck'1a and Ck'1b, these signals corresponding to signal Ck'1, according to whether Cd=Cda or Cd=Cdb.

Signal Ck'1a switches high when a rising or falling edge appears in signal Ckb1. Signals Cda and Ck'1a then are in different states. Once the edge has propagated through circuits 281 and 282, Ckb1=Cd=Cda is obtained. Signal Ck'1a then switches low. The frequency of signal Ck'1a is double that of signal Ckb1.

Similarly, the switchings to the high state of signal Ck'1b are controlled by the edges in signal Ckb1 and the switchings to the low state are controlled by the resulting edges which subsequently appear in signal Cdb. Assuming that signal Ckb1 is square and that the delay affecting signal Cdb corresponds to one quarter of the period of signal Ckb1, then signal Ck'1b, which also is a square signal, is generated.

By generating several delayed signals to generate the output signal of the frequency multiplying circuit, that is, Ck'1, the output signal may be adapted to several different applications.

For latches, the operation of which is responsive to edges in a control signal, a control clock signal having any duty ratio may be provided (of the shape, for example, of signal Ck'1a of FIG. 5c).

The delay necessary to generate the control signal may thus be reduced or minimized, which reduces or minimizes the number of circuits used to generate the delay.

For circuits responsive to logic states of control signals, such as master-slave registers, control signals having a duty ratio of ½ may be provided, by increasing the delay used.

In the example illustrated by FIGS. 5c and 5e, it should be noted that the falling edges of signals Ck'1a and Ck'1b are shifted in time (shifted rising edges may similarly be generated, for example, by arranging an inverter at the output of gate 35).

Assume that the signals generated by different frequency multiplying circuits, similar in their principle to that illustrated, are used to drive different logic devices responsive to falling edges. By setting differently the delays in the frequency multiplying circuits, the state modification times may be shifted in time in the driven logic devices. This enables to limit, on the one hand, the general instantaneous power consumption of these devices and, on the other hand, the noise likely to be generated, on the power supplies supplying the devices, by the state switchings in said devices.

In the example illustrated, logic circuit L1 is supplied by a supply potential Vd2 and by the ground potential. Advantageously, clock distribution circuit 11 will be partly supplied by a reduced supply potential Vd1, of lower value than supply potential Vd2. This reduces or minimizes the power consumed by the clock distribution circuit. Thus, in the example described, logic gate 35 of frequency multiplying circuit 211 is supplied by supply potential Vd2, to generate a clock signal Ck'1, the potential of which oscillates between the desired supply potential Vd2 and the ground potential. However, the other elements of clock distribution circuit 11, such as illustrated for the buffer circuits and gate 27 of FIG. 4, may be supplied by reduced supply potential Vd1. This supply by a reduced potential will not cause a reduction in the operating speed since, the operating frequency itself is reduced in the portion of the distribution circuit supplied by this potential. The logic gates of this portion of the distribution circuit can thus, without adverse affects, have lower switching rates (it will be sufficient that these speeds, which are proportional to the supply potential, are compatible with the operating frequency desired for these gates).

Of course, the present invention could be implemented differently without departing from the scope of the present invention.

Thus, a more or less significant number of clock signals may be generated. A single clock signal could even be generated, to drive one logic circuit. If a single logic circuit is to be used, it will generally be preferred to place it physically close to the source, be it an oscillator or an access pin, which provides it with the clock signal driving it. However, the definition constraints of the circuit including this logic circuit can happen to be such that this is not possible. A conductive line and means of regeneration of the clock signal may then have to be used to bring the clock signal to the logic circuit, thus forming a clock distribution circuit, in which the present invention may be implemented.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit including at least one logic circuit, operable at a first operating frequency, and a clock distribution circuit, the clock distribution circuit receiving a first clock signal and providing the logic circuit with a second clock signal, generated based on the first clock signal, the frequency of the second clock signal being substantially equal to the first operating frequency, wherein the clock distribution circuit includes a frequency multiplying circuit for generating the second clock signal, so that the frequency of the first clock signal may be lower than the first operating frequency to minimize the power consumed by the clock distribution circuit, and wherein, the logic circuit is supplied by a first supply potential, and the clock distribution circuit is partly supplied by a second supply potential, of a value lower than the value of the first supply potential, to minimize the power consumed by the clock distribution circuit.

2. The circuit of claim 1, wherein the frequency multiplying circuit includes at least one logic gate, and wherein the logic gates of the frequency multiplying circuit are supplied by the first supply potential and the remaining elements of the frequency multiplying circuit and of the clock distribution circuit are supplied by the second supply potential.

3. The circuit of claim 1, wherein the clock distribution circuit includes a frequency dividing circuit for generating, from the first clock signal, a clock signal internal to the clock distribution circuit, the internal clock signal having a frequency lower than the frequency of the first clock signal, to minimize the power consumed by the clock distribution circuit.

4. The circuit of claim 1, wherein the frequency multiplying circuit includes control means for maintaining the second clock signal in a permanent state, to minimize the power consumed by the logic circuit.

5. The circuit of claim 1, the frequency multiplying circuit receiving an input clock signal, wherein the frequency multiplying circuit includes, on the one hand, delay means for generating, by temporal phase shifting, based on the input clock signal, a delayed clock signal and, on the other hand, logic means for generating the second clock signal by performing a logic combination of X-OR type between the input clock signal and the delayed clock signal.

6. The circuit of claim 5, wherein the frequency multiplying circuit includes means for modifying the temporal phase shifting applied to the input clock signal.

7. The circuit of claim 6, wherein the frequency multiplying circuit includes, on the one hand, several delay means for generating, by temporal phase shifting, several delayed signals and, on the other hand, selection means for combining the input clock signal with one of the delayed signals.

8. An integrated circuit including at least one logic circuit, and a clock distribution circuit, the clock distribution circuit receiving a first clock signal and providing the logic circuit with a second clock signal, wherein the clock distribution circuit includes a frequency multiplying circuit for generating the second clock signal, and wherein the logic circuit is supplied by a first supply potential, and the clock distribution circuit is partly supplied by a second supply potential, of a value lower than the value of the first supply potential.

9. The circuit of claim 8, wherein the frequency multiplying circuit includes at least one logic gate, and wherein the logic gates of the frequency multiplying circuit are supplied by the first supply potential and the remaining elements of the frequency multiplying circuit and of the clock distribution circuit are supplied by the second supply potential.

10. The circuit of claim 8, wherein the clock distribution circuit includes a frequency dividing circuit for dividing the frequency of the first clock signal.

11. The circuit of claim 8, wherein the frequency multiplying circuit receives an input clock signal, and wherein the frequency multiplying circuit includes delay means for generating a delayed clock signal and logic means for generating the second clock signal by performing a logic combination of X-OR type between the input clock signal and the delayed clock signal.

12. The circuit of claim 11, wherein the frequency multiplying circuit includes means for modifying the delay applied to the input clock signal.

13. The circuit of claim 12, wherein the clock distribution circuit includes a frequency dividing circuit for dividing the frequency of the first clock signal.

14. The circuit of claim 13, wherein the logic means of the frequency multiplying circuit are supplied by the first supply potential and the remaining elements of the frequency multiplying circuit and of the clock distribution circuit are supplied by the second supply potential.

15. The circuit of claim 11, wherein the clock distribution circuit includes a frequency dividing circuit for dividing the frequency of the first clock signal.

16. An integrated circuit including at least one logic circuit, and a clock distribution circuit, the clock distribution circuit receiving a first clock signal and providing the logic circuit with a second clock signal, wherein the clock distribution circuit includes a frequency multiplying circuit for generating the second clock signal, and wherein the frequency multiplying circuit includes a control circuit which places the second clock signal in a permanent state;

wherein the clock distribution circuit includes a frequency dividing circuit for dividing the frequency of the first clock signal; and wherein the frequency multiplying circuit receives an input clock signal, and wherein the frequency multiplying circuit includes delay means for generating a delayed clock signal and logic means for generating the second clock signal by performing a logic combination of X-OR type between the input clock signal and the delayed clock signal.

17. The circuit of claim 16, wherein the frequency multiplying circuit includes means for modifying the delay applied to the input clock signal.

18. The circuit of claim 17, wherein the clock distribution circuit includes a frequency dividing circuit for dividing the frequency of the first clock signal.

19. The circuit of claim 18, wherein the logic circuit is supplied by a first supply potential, and the clock distribution circuit is partly supplied by a second supply potential, of a value lower than the value of the first supply potential.

20. The circuit of claim 19, wherein the logic means of the frequency multiplying circuit are supplied by the first supply potential and the remaining elements of the frequency. multiplying circuit and of the clock distribution circuit are supplied by the sucond supply potential.

21. The circuit of claim 17, wherein the logic circuit is supplied by a first supply potential, and the clock distribution circuit is partly supplied by a second supply potential, of a value lower than the value of the first supply potential. multiplying circuit and of the clock distribution circuit are supplied by the second supply potential.

22. The circuit of claim 16, wherein the clock distribution circuit includes a frequency dividing circuit for dividing the frequency of the first clock signal.

23. The circuit of claim 22, wherein the logic circuit is supplied by a first supply potential, and the clock distribution circuit is partly supplied by a second supply potential, of a value lower than the value of the first supply potential.

24. The circuit of claim 16, wherein the logic circuit is supplied by a first supply potential, and the clock distribution circuit is partly supplied by a second supply potential, of a value lower than the value of the first supply potential.

25. An integrated circuit including at least one logic circuit, and a clock distribution circuit, the clock distribution circuit receiving a first clock signal and providing the logic circuit with a second clock signal, wherein the clock distribution circuit includes a frequency multiplying circuit for generating the second clock signal, and wherein the frequency multiplying circuit receives an input clock signal, and wherein the frequency multiplying circuit includes a delay circuit which generates a delayed clock signal, and a logic circuit which generates the second clock signal by performing a logic combination of X-OR type between the input clock signal and the delayed clock signal, and wherein the frequency multiplying circuit includes a circuit which modifies the delay applied to the input clock signal, and wherein the frequency multiplying circuit includes several delay circuits which generate several delayed clock signals and a selection circuit which selects one of the delayed clock signals to combine with the input clock signal.

26. The circuit of claim 25, wherein the logic circuit is supplied by a first supply potential, and the clock distribution circuit is partly supplied by a second supply potential, of a value lower than the value of the first supply potential.

27. The circuit of claim 25, wherein the clock distribution circuit includes a frequency dividing circuit for dividing the frequency of the first clock signal.

28. The circuit of claim 27, wherein the logic circuit is supplied by a first supply potential, and the clock distribution circuit is partly supplied by a second supply potential, of a value lower than the value of the first supply potential.

29. The circuit of claim 25, wherein the frequency multiplying circuit includes control means for maintaining the second clock signal in a permanent state.

30. The circuit of claim 29, wherein the logic circuit is supplied by a first supply potential, and the clock distribution circuit is partly supplied by a second supply potential, of a value lower than the value of the first supply potential.

31. The circuit of claim 30, wherein the clock distribution circuit includes a frequency dividing circuit for dividing the frequency of the first clock signal.

32. The circuit of claim 31, wherein the logic means of the frequency multiplying circuit are supplied by the first supply potential and the remaining elements of the frequency multiplying circuit and of the clock distribution circuit are supplied by the second supply potential.

33. An integrated circuit including at least one logic circuit, and a clock distribution circuit, the clock distribution circuit receiving a first clock signal and providing the logic circuit with a second clock signal, wherein the clock distribution circuit includes a frequency multiplying circuit for generating the second clock signal, and wherein the frequency multiplying circuit receives an input clock signal, and wherein the frequency multiplying circuit includes delay means for generating a delayed clock signal, and a logic circuit which generates the second clock signal by performing a logic combination of X-OR type between the input clock signal and the delayed clock signal, and wherein the frequency multiplying circuit includes a circuit which modifies the delay applied to the input clock signal, and wherein the frequency multiplying circuit includes several delay means for generating several delayed clock signals and a selection means for combining the input clock signal with one of the delayed signals.

* * * * *